(12) United States Patent
Brooker

(10) Patent No.: US 6,228,224 B1
(45) Date of Patent: May 8, 2001

(54) PROTECTIVE REFRACTORY SHIELD FOR A GASIFIER

(75) Inventor: Donald Duane Brooker, Hopewell Junction, NY (US)

(73) Assignee: Texaco Inc., White Plains, NY (US)

( * ) Notice: Subject to any disclaimer, the term of this patent is extended or adjusted under 35 U.S.C. 154(b) by 0 days.

(21) Appl. No.: 09/128,817

(22) Filed: Aug. 4, 1998

(51) Int. Cl.[7] .................................. C10B 1/00; C10J 3/00; F27B 5/06

(52) U.S. Cl. ..................... 202/224; 202/217; 202/222; 48/89; 48/126

(58) Field of Search .................. 48/89–101, 119, 48/126; 202/217, 219, 221, 222, 224

(56) References Cited

U.S. PATENT DOCUMENTS

| | | | | |
|---|---|---|---|---|
| 3,568,611 | * | 3/1971 | Konrad | 110/135 |
| 4,443,230 | * | 4/1984 | Stellaccio | 48/197 R |
| 4,491,456 | * | 1/1985 | Schlinger | 48/197 R |
| 5,273,212 | * | 12/1993 | Gerhardus et al. | 239/132.3 |
| 5,464,592 | * | 11/1995 | Brooker et al. | 422/207 |
| 5,941,459 | * | 8/1999 | Brooker et al. | 239/397.5 |

\* cited by examiner

*Primary Examiner*—Marian C. Knode
*Assistant Examiner*—Alexa A. Doroshenk
(74) *Attorney, Agent, or Firm*—Morris N. Reinisch; Rodman & Rodman

(57) ABSTRACT

The protective refractory shield for a gasifier includes a refractory attachment that is mechanically secured to a protectable surface of the gasifier. The refractory attachment includes a plurality of attachment members of predetermined angular sector. The refractory attachment is provided to cover a downwardly facing horizontal surface of the gasifier or to be positioned upon a vertical surface thereof. Latching means for the attachment include a projecting formation that projects from the protectable surface that engages a complementary shaped recess in the attachment to mechanically secure the attachment to the protectable surface. The latching means do not form recesses in the protectable surface nor does the refractory attachments form recesses in the protectable surface. Thus the integrity of the protectable surface is maintained while it is protected.

21 Claims, 7 Drawing Sheets

PROTECTIVE REFRACTORY SHIELD FOR A GASIFIER

BACKGROUND OF THE INVENTION

This invention is directed to gasifiers for processing carbonaceous fuels and more particularly to a novel protective refractory shield that is mechanically secured against a protectable surface of the gasifier.

The processing of carbonaceous fuels, including coal, oil and gas to produce gaseous mixtures of hydrogen and carbon monoxide, such as coal gas, synthesis gas, reducing gas or fuel gas is generally carried out in a high temperature environment of a partial oxidation gasifier with operating temperatures of approximately 2400° F. to 3000° F. Partial oxidation gasifiers, an example of which is shown in U.S. Pat. No. 2,809,104, are operable with an annulus type fuel injector nozzle for introducing pumpable slurries of carbonaceous fuel feed components into a reaction chamber of the gasifer along with oxygen containing gases for partial oxidation. The annulus type fuel injector nozzle, which is a well known structure, is generally formed of metal such as super alloy steel, to enable it to withstand the relatively high operating temperatures of the gasifier.

The coal-water sluny that passes through an outlet orifice of the fuel injector nozzle normally self-ignites at the operating temperatures of the gasifier. Self-ignition of the fuel feed components usually occurs at a region close to the outlet orifice of the fuel injector nozzle, also known as the reaction zone. The reaction zone is generally the highest thermal gradient zone in the gasifier and the temperature conditions at the reaction zone can cause thermal induced fatigue cracking at the outlet orifice of the fuel injector nozzle.

During gasifier processing of the coal-water slurry component that is fed through the fuel injector nozzle, one of the reaction products is gaseous hydrogen sulfide, a well known corrosive agent. Liquid slag is also formed during the gasification process as a by-product of the reaction between the coal-water slurry and the oxygen containing gas, and is another well known corrosive agent.

Because the outlet orifice of the fuel injector nozzle is exposed to corrosive gases and corrosive slag while operating at the extreme temperature conditions previously described, it is particularly vulnerable to breakdown caused by heat corrosion, thermal induced fatigue cracking and chemical deterioration, also referred to as thermal damage and thermal chemical degradation. Once there is a breakdown of the fuel injector nozzle shut down of a gasifier is unavoidable because the gasification process cannot be carried out until repair or replacement of the fuel injector nozzle is accomplished.

Any shutdown of an operating gasifier is costly because of the termination of synthesis gas ("syngas") production which is normally continuous when the gasifier is in operation. The downtime that is usually required before a fuel injector nozzle can be repaired or replaced can be approximately 8 hours if there is no damage to the refractory of the gasifier. In a typical gasifier 8 hours downtime translates into a significant loss of syngas production. If there is damage to the refractory of the gasifier a substantially longer downtime than 8 hours is usually required for repair of the gasifier.

Since the fuel injector nozzle is one of the most vulnerable components in the gasifier and operational shutdowns attributable to fuel injector nozzle repair and placement generally result in substantial losses of syngas production there have been going efforts to extend the operating life of the fuel injector nozzle.

Attempts to extend the operating life of a fuel injector nozzle especially by fording some means of high temperature and corrosion protection to the outlet orifice area are well known. For example U.S. Pat. No. 4,491,456 to Schlinger shows a thermal shield for a fuel injector nozzle. The thermal shield is held in vertical orientation around the fuel injector nozzle by a bonding material that joins the thermal shield to a protectable surface of the fuel injector nozzle. However, the bonding material is subject to substantially the same temperature conditions as an unprotected fuel injector nozzle and is thus vulnerable to thermal damage and consequential thermal chemical degradation which can cause failure of the bonding material. Failure of the bonding material will permit the thermal shield to fall away from the outlet end of the fuel injector nozzle, thereby directly exposing the outlet end to the corrosive and thermally damaging ambient conditions in the gasifier.

Published Canadian application 2,084,035 to Gerhardus et al shows protective ceramic platelets to clad the surface of a fuel injector nozzle. The ceramic platelets are held in place by a dovetail projection formed on the platelet that engages a complementary shaped dovetail slot formed in the end surface of the fuel injector nozzle. The dovetail slot formations in the end surface of the fuel injector nozzle are sections of reduced thickness with inside corners that are stress concentration areas vulnerable to cracking and thermal damage. In addition, the dovetail projection on the ceramic platelets have a narrow support neck that is likely to be an area of weakness or breakage. Breakage of the support neck can cause the ceramic platelets to fall away from the end surface of the fuel injector nozzle.

It is thus desirable to provide a protective refractory shield for a protectable surface inside the gasifier, including the outlet orifice of a fuel injector nozzle, wherein the protective refractory shield can be mechanically secured to the protectable surface without the need to recess the securement structure or the refractory material in the protectable surface.

During the gasification process molten slag gradually flows downwardly along the inside walls of the gasifier to a water bath of the type shown in U.S. Pat. No. 5,464,592. The molten slag, before reaching the water bath, flows through a throat section at a floor portion of the gasifier and closely past a quench ring and dip tube that leads to the water bath. The quench ring, which is formed of a chrome nickel iron alloy or nickel based alloy such as Incoloy is arranged to spray or inject water as a coolant against the walls of the dip tube. However the quench ring, which includes downwardly directed surfaces that can be contacted by molten slag, may experience temperatures of approximately 1800° F. to 2800° F.

Because the quench ring can be exposed to the molten slag and corrosive gases at temperatures of approximately 1800° F. to 2800° F. it is vulnerable to thermal damage and thermal chemical degradation, especially at the downwardly directed surfaces that surround the dip tube. If the downwardly directed surfaces of a quench ring are thermal shielded with a bonded refractory material, high temperature degradation of the bonding material is likely to occur resulting in fall off of the refractory material from the protectable surface.

It is thus desirable to provide a quench ring with a protective refractory shield that does not require bonding of the refractory material to a protectable surface and does not require recessing of the refractory material in the protectable surface.

OBJECTS AND SUMMARY OF THE INVENTION

Among the several objects of the invention may be noted the provision of a novel protective refractory shield for a gasifier, a novel protective refractory shield for a gasifier that is mountable to a protectable surface in the gasifier without recessing the refractory material in the protectable surface, a novel protective refractory shield for a gasifier that can be securely suspended from a generally horizontal surface or be securely positioned on a generally vertical surface, a novel protective refractory shield for a gasifier that can be mechanically secured against a protectable surface in the gasifier without the refractory material invading the protectable surface of the gasifier, a novel protective refractory shield for a gasifier that is constituted as a mechanically securable annular attachment, a novel protective refractory shield for a gasifier that is constituted as a mechanically securable refractory attachment and a novel protective refractory shield for a gasifier that includes latching means for mechanically securing refractory members onto the protectable surface without forming any recesses in the protectable surface.

Other objects and features of the invention will be in part apparent and in part pointed out hereinafter.

In accordance with the invention the protective refractory shield for a gasifier includes a refractory attachment mountable on a protectable surface inside the gasifier. The attachment has a heat exposure surface that is exposed to the heat stream in the gasifier. The attachment also includes a securement surface that confronts the protectable surface inside the gasifier. Latching means are provided at the securement surface of the attachment and at the protectable surface of the gasifier for mechanical securement of the attachment onto the protectable surface without the attachment penetrating the protectable surface.

In one embodiment of the invention the refractory attachment is annular and includes a plurality of attachment members of predetermined angular sector. Each of the attachment members have pair of angularly spaced end portions. The attachment members are in substantial abutment at the end portions when they are positioned on the protectable surface.

The latching means for securing the attachment to the protectable surface includes a wedge-shaped or "T"-shaped formation in cross-section that projects from the protectable surface. The term "T"-shaped as used hereinafter is intended to encompass both wedge-shaped and "T"-shaped formations. The "T"-shaped formation has a generally circular path with a predetermined discontinuity such that the "T"-shaped formation has free end portions. The latching means further include a latch recess of "T"-shaped cross-section complementary with the "T"-shaped formation on the protectable surface. The refractory attachment is mountable to the protectable surface by engaging the latch recess of each attachment member with a free end of the "T"-shaped formation and sequentially loading the attachment members onto the "T"-shaped formation until the "T"-shaped formation has been fully loaded. The discontinuity in the "T"-shaped formation is then partially filled by adding an extension to the "T"-shaped formation. An attachment member of smaller size than the previous attachment members is then loaded onto the "T"-shaped formation. The previously loaded attachment members are slid along the "T"-shaped formation until an attachment member bridges the partially filled discontinuity. The attachment members, which necklace the "T"-shaped formation, are locked in position to prevent sliding of the attachment members on the "T"-shaped formation.

In separate embodiments of the invention the "T"-shaped formation can be provided on a substantially horizontal protectable surface of the gasifier, such as at the fuel injector nozzle and in another embodiment of the invention the "T"-shaped formation can be provided on a annular vertical surface, such as at the quench ring.

The invention accordingly comprises the constructions hereinafter described, the scope of the invention being indicated in the claims.

DESCRIPTION OF THE DRAWINGS

In the accompanying drawings.

Corresponding reference numbers indicate corresponding parts throughout the several views of the drawings.

DETAILED DESCRIPTION OF THE INVENTION

Figure 1:
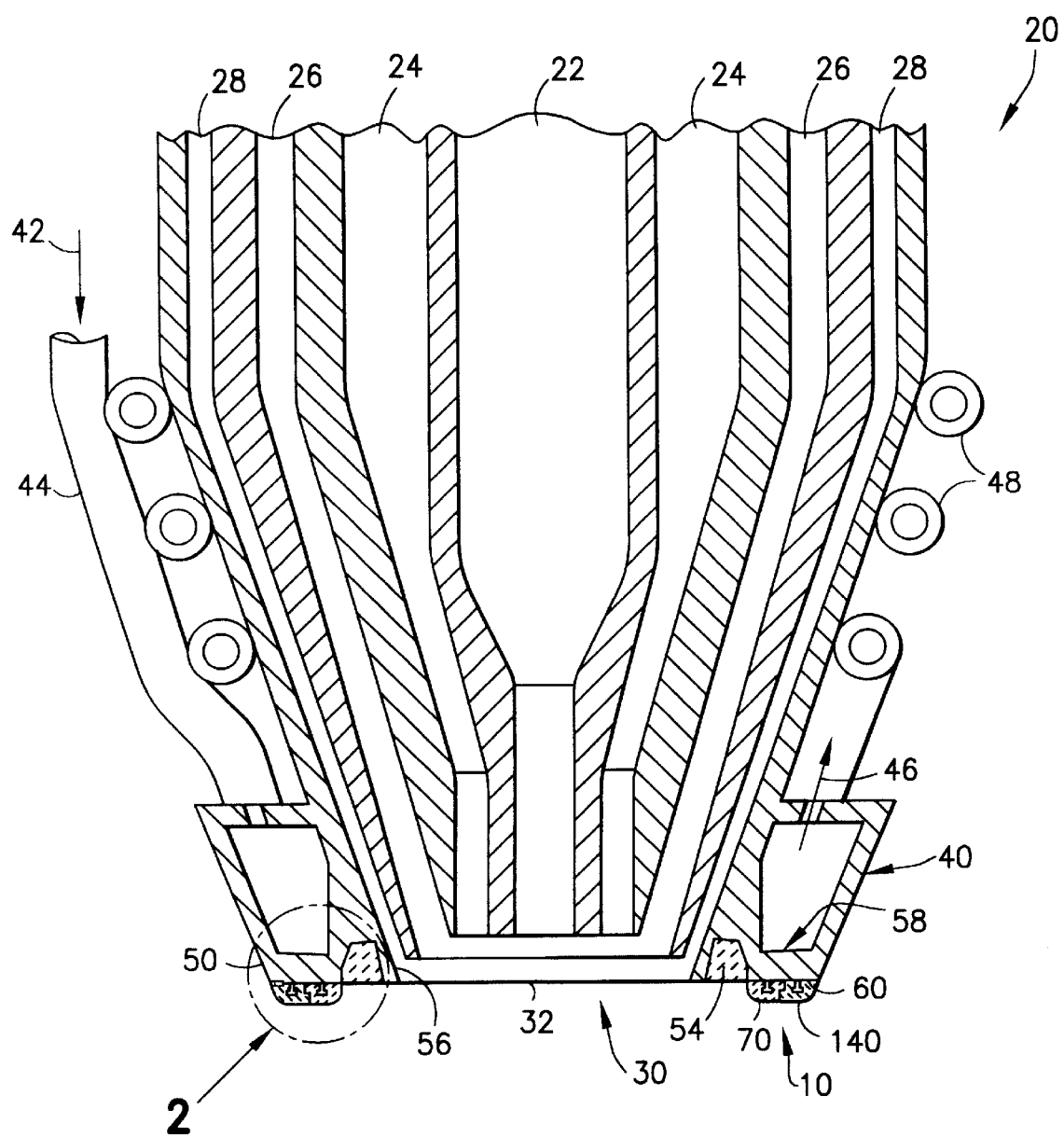
FIG. 1 is a simplified schematic elevation view, partly shown in section, of a multi-annulus fuel injector nozzle for a gasifier with a protective refractory shield incorporating one embodiment of the invention.

A protective refractory shield for a gasifier incorporating one embodiment of the invention as generally indicated by the reference number 10 in FIG. 1. The protective refractory shield 10 is mounted to a fuel injector nozzle 20 of the type used for partial oxidation gasifiers, for example, and described in detail in U.S. Pat. No. 4,443,230 to Stellacio.

The fuel injector nozzle 20 has a central feed stream conduit 22, and concentric annular feed stream conduits 24, 26 and 28 that converge at a nozzle outlet end 30 to form an outlet orifice 32.

In a typical operation of the fuel injector nozzle 20, the conduit 22 provides a feed stream of gaseous fuel materials such as, for example, from the group of free oxygen containing gas, steam, recycled product gas and hydrocarbon gas. The conduit 24 provides a pumpable liquid phase slurry of solid carbonaceous fuel such as, for example, a coal-water slurry. The annular conduits 26 and 28 provide two separate streams of fuel such as, for example, free oxygen containing gas optionally in admixture with a temperature moderator.

The outgoing oxygen containing gas, carbonaceous slurry stream, and free oxygen containing gas streams from the conduits 22, 24, 26 and 28 merge at a predetermined distance beyond the outlet orifice 32 of fuel injector nozzle 20 in close proximity to the nozzle outlet end 30 to form a reaction zone (not shown) wherein the merging fuel streams self-ignite. Self ignition of the fuel streams is enhanced by the breakup or atomization of the merging fuel streams as they exit from the nozzle outlet orifice 32. Such atomization promotes the product reaction and heat development that is required for the gasification process. As a result, the reaction zone that is in close proximity to the outlet end 30 of the fuel injector nozzle 10 is characterized by intense heat, with temperatures ranging from approximately 2400° F. to 3000° F.

An annular coaxial water cooling jacket 40 is provided at the outlet end 30 of the fuel injector nozzle 10 to cool the outlet end 30. The annular cooling jacket 40 receives incoming cooling water 42 through an inlet pipe 44. The cooling water 42 exits at 46 from the annular cooling jacket 40 into a cooling coil 48 and then exits from the cooling coil 48 into any suitable known recirculation or drainage device. An outer annular surface 50 of the cooling jacket 40 forms the outer annular surface of the outlet orifice 32.

A refractory insert 54 is provided at the outlet end 30 between the cooling jacket 40 and an inner surface 56 of the outlet orifice 32 at the outlet end 30, and does not form a part of the present invention. An annular base wall portion 58 of the outlet end 30 forms a bottom wall of the cooling jacket 40 that is exposed to the intense heat generated at the reaction zone of the fuel injector nozzle 20. The base wall portion 58 is thus vulnerable to thermal damage and thermal chemical degradation that can cause leakage of the cooling jacket 40 and thereby accelerate breakdown of the fuel injector nozzle 20.

The protective refractory shield 10 is provided on a generally horizontal heat receiving surface 60 of the annular base wall portion 58 at the nozzle outlet end 30. The heat receiving surface 60 thus constitutes a protectable surface. The protective refractory shield 10 includes a radially inner annular refractory attachment 70 and a radially outer annular refractory attachment 140 both of which have a generally circular shape.

Figure 2:
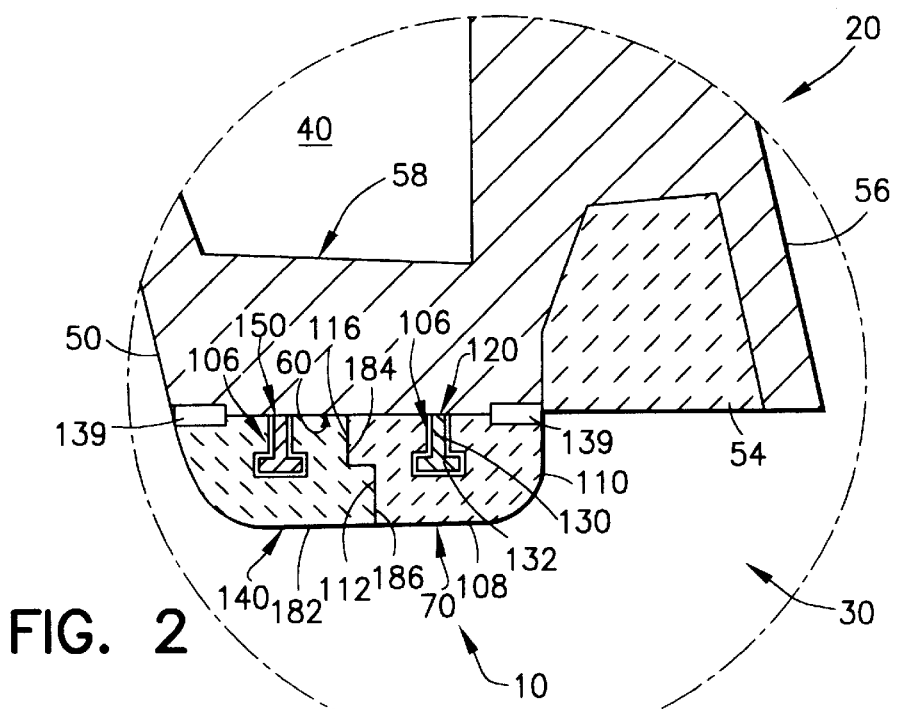
FIG. 2 is an enlarged fragmentary view of structure in the reference circle 2 of FIG. 1.
Figure 4:
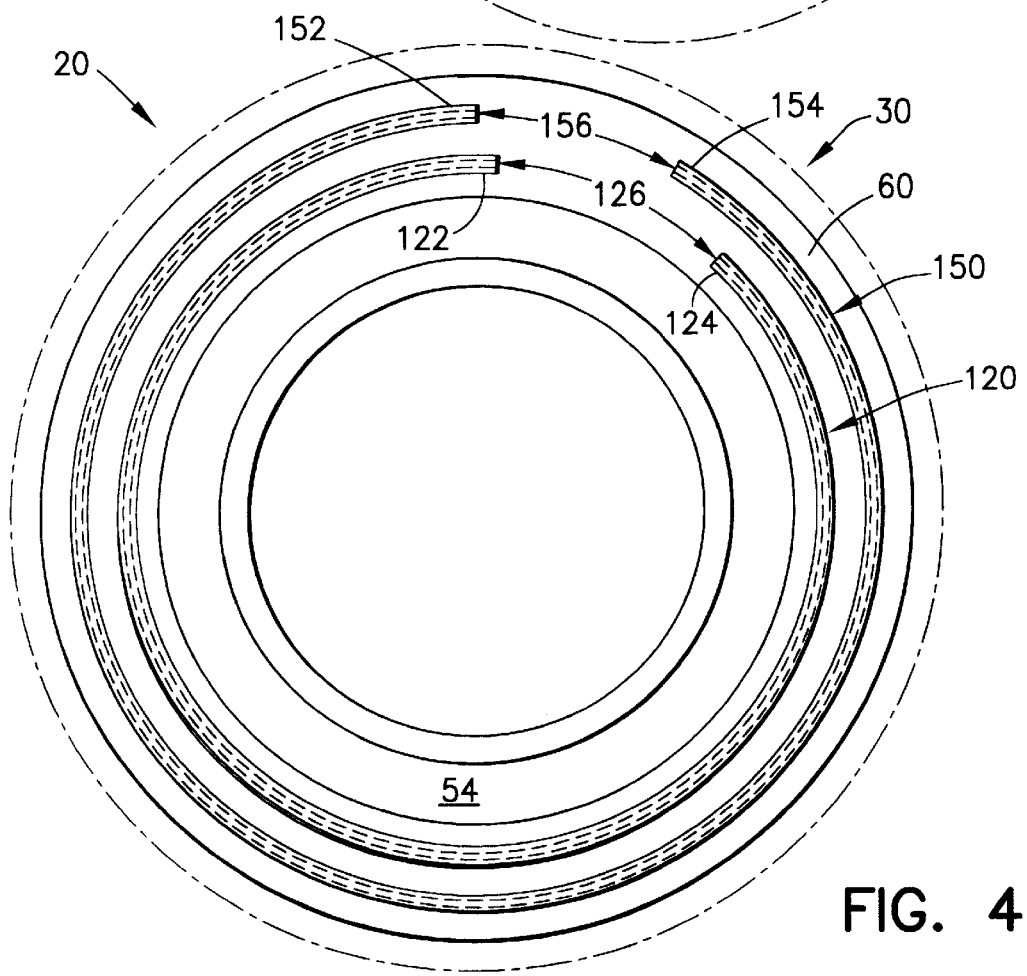
FIG. 4 is a bottom view of the fuel injector nozzle showing the latching means including a latching rail provided thereon for securing the refractory attachments of the protective shield, the inner annuli of the fuel injector nozzle being omitted herein and in subsequent figures for purposes of clarity.
Figure 3:
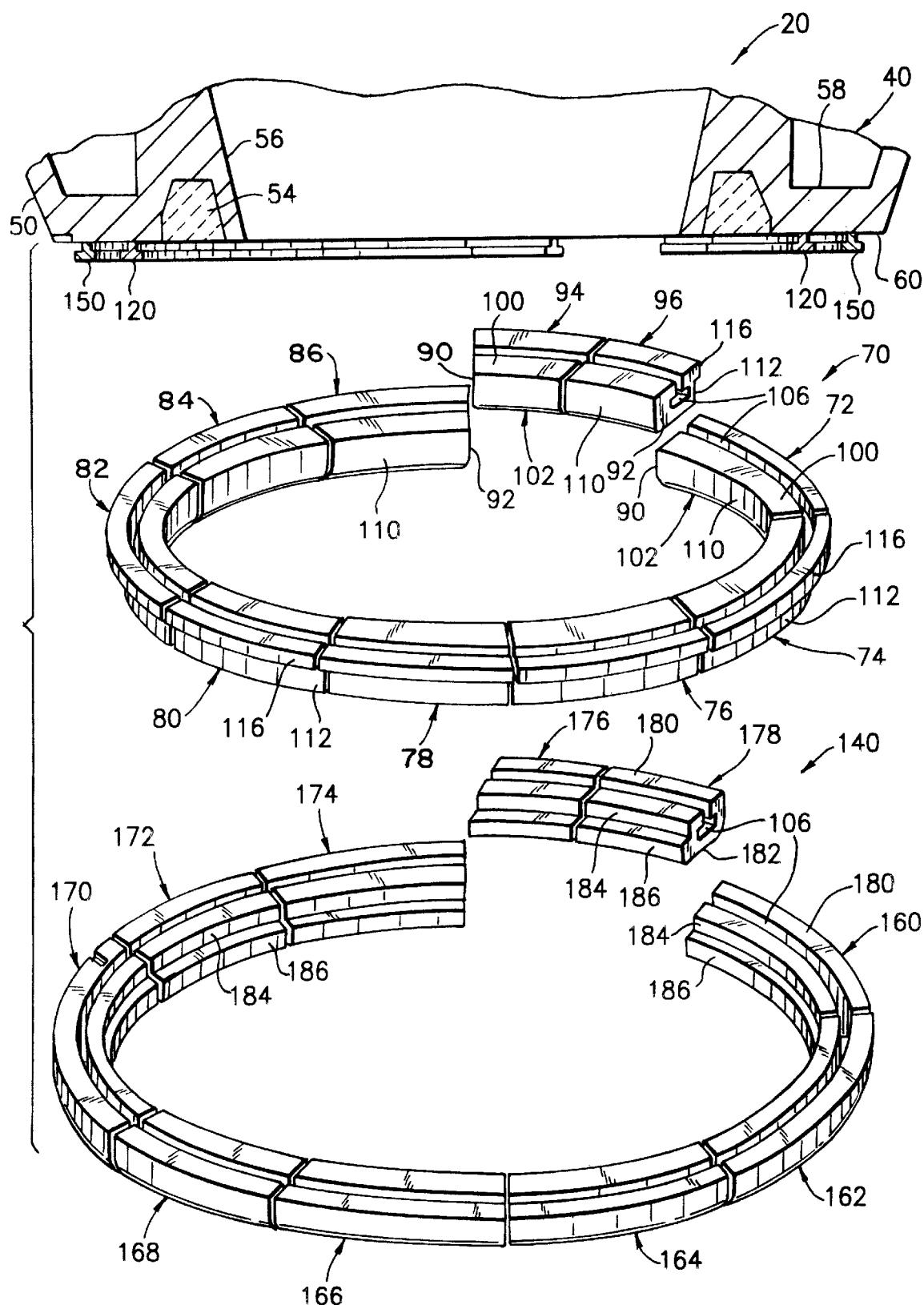
FIG. 3 is an exploded view thereof showing attachment components of the annular refractory shield prior to installation at the outlet orifice of the fuel injector nozzle.

Referring to FIGS. 2–4 and especially FIG. 3, the radially inner annular refractory attachment, hereinafter referred to as the inner attachment 70 includes a plurality of attachment members or segments 72, 74, 76, 78, 80, 82, 84, and 86 of predetermined angular sector such as approximately 40° of arc. The segments 72–86 each have a pair of end portions 90 and 92 that are substantially planar. The annular attachment 70 further includes closure attachment members or closure segments 94 and 96 that are approximately half the angular sector of the segments 72–86, such as approximately 20° of arc. The closure segments 94 and 96 include the end portions 90 and 92 and are otherwise similar in structure to the segments 72–86.

Each of the segments 72–86 and 94–96 include a securement surface 100 (FIG. 3) that confronts the protectable surface 60 of the fuel injector nozzle 10. The segments 72–86 and 94–96 also include a heat exposure surface 102 that faces the heated environs of the gasifier chamber (not shown). The securement surface 100 (FIG. 3) is formed with latching means that include a "T"-shaped recess or slot 106 that extends from one planar end portion 90 to the opposite planar end portion 92 of each of the segments 72–86 and 94–96. The heat exposure surface 102 (FIG. 3) includes a flat surface portion 108 (FIG. 2) opposite the latch recess 106. The flat surface portion 108 lies in a substantially horizontal plane, perpendicular to a central axis of the annular refractory attachment 70.

Each of the segments 72–86 and 94–96 include a radially inner peripheral surface 110 (FIG. 3 ) and a radially outer peripheral surface 112. The radially outer peripheral surface 112 is formed with an upper projecting ledge or step 116 at the securement surface 100.

Referring to FIGS. 2–4 latching means including a "T"-shaped latch element or latch rail 120 is provided on the protectable surface 60 of the fuel injector nozzle 20. In cross-section (FIG. 2) the "T"-shaped rail 120 includes a leg portion 130 that is welded to he protectable surface 60 and a flange 132 at an end of the "T" that is spaced from the surface 60. The "T"-shaped latch rail 120 is of complementary cross-section with the latch recess 106 of the segments 72–86 and 94–96. The latch rail 120 is a substantially annular formation with free end portions 122 and 124 (FIG. 4) that define a discontinuity 126 of the rail 120. The discontinuity 126 is approximately 42–45° in arc and slightly longer than any of the segments 72–86 to permit location of the segments in the discontinuity 126 for the loading of the segments onto the "T"-shaped rail 120.

Figure 5:
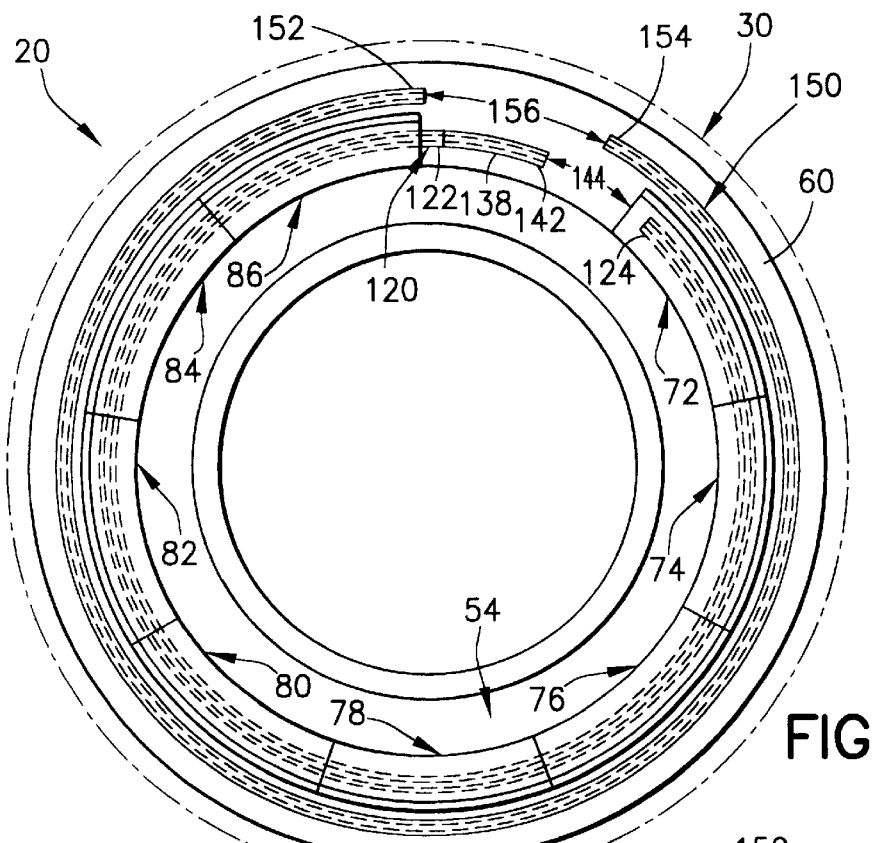
FIG. 5 is a bottom sectional view similar to FIG. 4 showing members of an annular refractory attachment being positioned on a latching rail.

Assembly of the annular refractory attachment 70 to the protectable surface 60 is accomplished by sequential loading of the segments 72–86 and 94–96 on the rail 120. For example a first segment such as 72 is placed in the discontinuity 126 (FIG. 4) with the segment end 90 aligned with the rail end 122. The segment 72 is loaded on the "T"-shaped rail 120 (FIG. 5) with the segment recess 106 at the segment end 90 first engaging the free end 122 of the "T"-shaped rail 120. The segment 72 is slid along the "T"-shaped rail 120 until the end portion 90 is located proximate the free end 124 of the "T"-shaped rail 120 as shown in FIG. 5. The remaining segments 74, 76, 78, 80, 82, 84 and 86 are then sequentially loaded on the "T"-shaped rail 120 in a manner similar to that described for the segment 72 and slid along the rail 120 such that the end portions 90 and 92 of the loaded segments are in substantial abutment as shown in FIG. 5.

Figure 7:
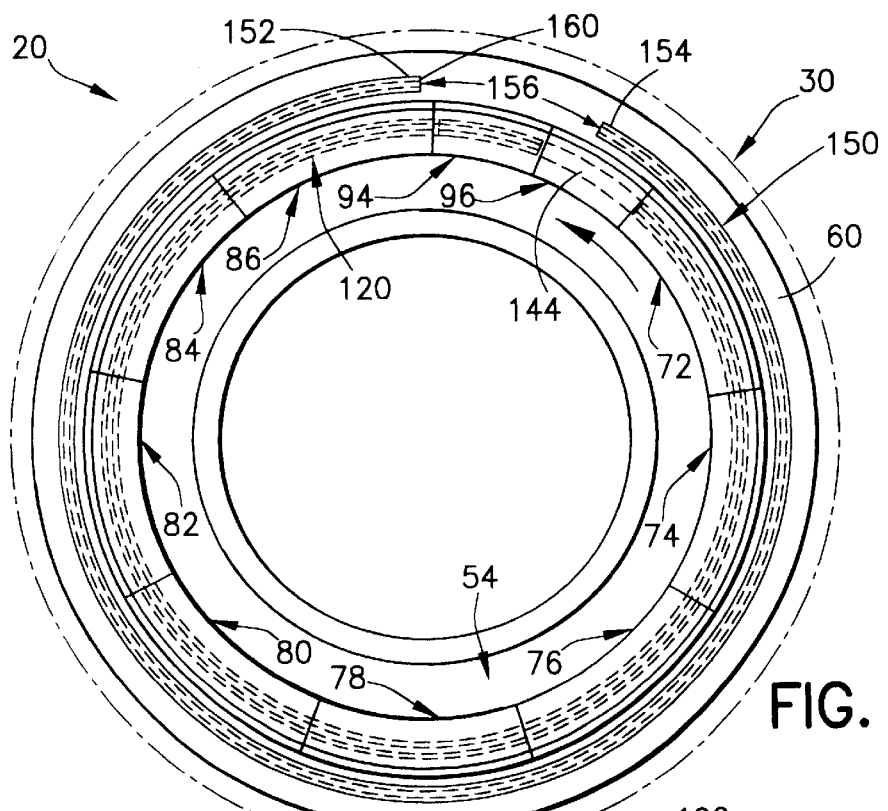

After the segments 72–86 are loaded onto the rail 120 a rail section 138, approximately 20° in arc, is welded to the protectable surface 60 in abutment with the free end 122 of the rail 120 (FIG. 7) to form an appendage to the rail 120 and partially fill the discontinuity 126. The rail section 138 is thus an arcuate continuation of the rail 120 and as a free end 142 spaced from the free end 124 of the rail 120 to define a reduced discontinuity or gap 144 (FIG. 5). The discontinuity 144 encompasses an arc of approximately 23° which is slightly longer than the arc encompassed by each of the closure segments 94 and 96.

Figure 6:
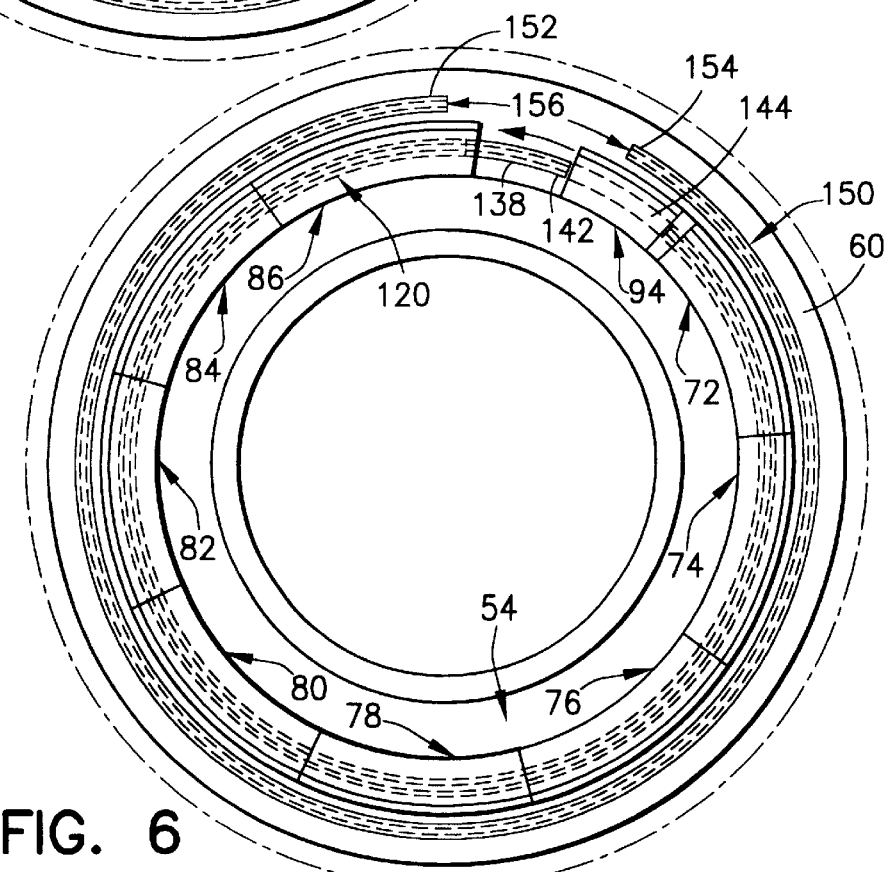
FIGS. 6 and 7 are views similar to FIG. 5 showing the completion of an installation of the annular refractory attachment on the latching rail.

The closure segment 94 (FIG. 6), for example, is placed in the gap 144 and is loaded onto the rail section 138 with the end portion 90 first engaging the free end 142 of the rail section 138. The closure segment 94 is slid along the rail section 138 and onto the rail 120 until the end portion 90 is located against the end portion 92 of the last loaded section 86.

The closure segment 96 (FIG. 7) is also loaded onto the rail section 138 and the rail 120 in a manner similar to that described for the closure segment 94.

Figure 8:
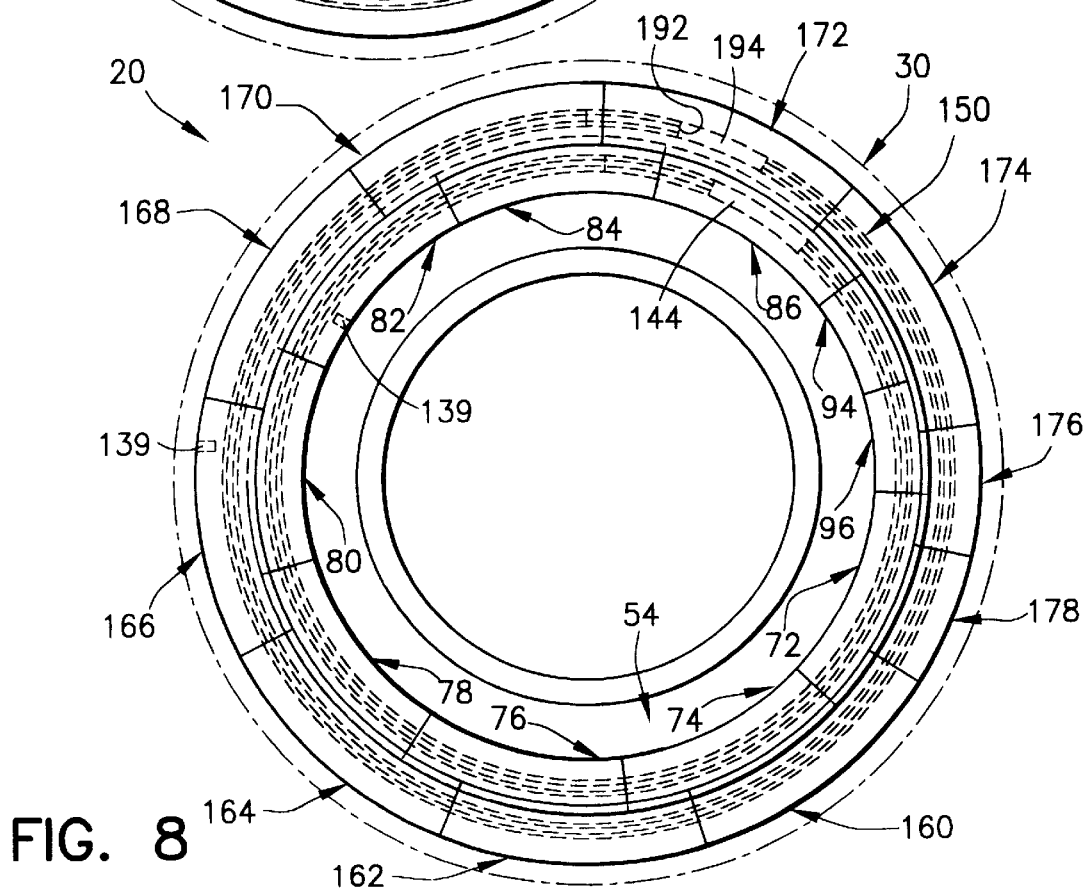
FIG. 8 is a view similar to FIG. 7 showing a second annular refractory attachment positioned radially beyond the first installed annular refractory attachment.

The loaded segments 72–86 and 94–96 now form a substantially continuous necklace of segments on the rail 120 and the rail section 138. The necklace of segments 72–86 and 94–96 are further slid on the rail 120 and the rail section 138 until one of the larger segments 72–86 bridges the discontinuity 144 (FIG. 8). The segments 72–86 and 94–96 are then locked into position in a suitable known manner. For example a steel pin 139 (FIGS. 2 and 7) is tapped into a hole that is drilled into one of the segments such as the segment 84 (FIG. 7) and the surface of the fuel injector nozzle 20 after all segments have been positioned on the rail 120 and the rail segment 138. The pin 139 can be positioned at the inside radius of the necklace of segments 72–86 and 94–96 as shown in FIG. 8 or at the outside radius of the necklace of segments 72–86 and 94–96 and prevents further sliding of the segment necklace on the rail 120 and the rail section 138. The pin 139 can be welded in place.

Latching means including a "T"-shaped rail 150 of larger diameter than the rail 120 but of similar cross-section to the Tail 120 is welded on the protectable surface 60 a predetermined radial distance from the rail 120 to permit concentric engagement between the attachments 70 and 140. The "T"-shaped rail 150 has the leg portion 130 and the "T" flange 132 identical to that of the "T"-shaped rail 120. The rail 150 also has free end portions 152 and 154 (FIG. 4) that define a discontinuity 156 of approximately 42° to 45° arc. The rail 150 accommodates the annular refractory attachment 140 which includes refractory segments 160, 162, 164, 166, 168, 170, 172 and 174 (FIG. 3) of approximately 40° arc and closure segments 176 and 178 of approximately 20° arc.

Each of the segments 160–174 and 170–178 include a securement surface 180 (FIG. 3) that corresponds to the securement surface 100 and confronts the protectable surface 60. The segments 160–174 and 170–178 also include a heat exposure surface 182 that corresponds to the heat exposure surface 108 (FIG. 2).

The securement surface 180 is formed with latching means that include the "T"-shaped recess or slot 106 that is of complementary cross section with the "T"-shaped rail 150.

The segments 160–174 and 170–178 have an inner peripheral surface 184 (FIG. 3) with a bottom ledge or step 186 at the horizontal portion of the heat exposure surface 182. The stepped inner peripheral surface 184 of the segments 160–174 and 170–178 is of complementary shape with the stepped outer peripheral surface of the segments 72–86 and 94–96 to permit concentric overlapping engagement between the segments of each of the attachments 70 and 140.

Assembly of the annular refractory attachment 140 to the protectable surface 60 is accomplished in a manner similar to that previously described for the attachment 70. Thus a first segment such as 160 is loaded onto the "T"-shaped rail 150 with the segment end 90 first engaging the free end 152 of the "T"-shaped rail 150. The remaining segments 162–174 are similarly loaded and slid along the "T"-shaped rail 150 until all such segments have been loaded. Under this arrangement the step-shaped formation 186 at the inner peripheral surface 184 of the segments 160–174 concentrically mesh with the step-shaped formation 116 at the outer peripheral surface 112 of the segments 72–86 and 94–96.

When all of the segments 160–174 have been loaded onto the rail 150, a rail segment 192 (FIG. 8) approximately 18° in arc is welded onto the protectable surface 60 at the free end 152 of the rail 150. The rail segment 192 forms a continuation of the rail 150 and thereby partially fills or narrows the discontinuity 156 (FIG. 7) to a gap 194 (FIG. 8) of approximately 23°.

The closure segments 176 and 178 are then loaded onto the rail segment 192 and the rail 150 in a manner similar to that previously described for the closure segments 94 and 96 to form a necklace of segments 160–178. The necklace of segments 160–178 is then slid around the rail 150 and the rail segment 192 until one of the larger segments 160–174 bridges the rail gap 194 (FIG. 8). The necklace of segments is then locked in position by another pin 139 (FIGS. 2 and 8) that is held in place as previously described for the necklace of segments 72–86 and 94–96. The pin 139 is drilled into one of the segments, such as the segment 166 (FIG. 8) and the surface 60 of the fuel injector nozzle 20.

Although the size of the attachments 70 and 140 can vary according to the size of the outlet end 30 of the fuel injector nozzle 20, a segment such as 72 can have a radius of approximately 3 inches to the inner peripheral surface 110 and a radial thickness of 4 inches from the inner peripheral surface 110 to the outer peripheral surface 112. The axial thickness from the surface 108 to the surface 100 is approximately ½ inch. The step 116 projects approximately ¼ inch from the outer peripheral surface and is approximately ¼ inch in axial thickness. The "T"-shaped rails 70 and 140 are approximately ⅛ to ¼ inch high from the protectable surface 60, $\frac{1}{16}$ inch wide at the leg 130 and ⅛ inch wide at the top of the "T" 132. The "T"-shaped slot 106 in the segments 72–84, 94–96 and 160–178 are sized to permit slideable movement of the segments and have a clearance of approximately $+\frac{1}{32}$ inches relative to the surface of the "T"-shaped rails.

Figure 9:
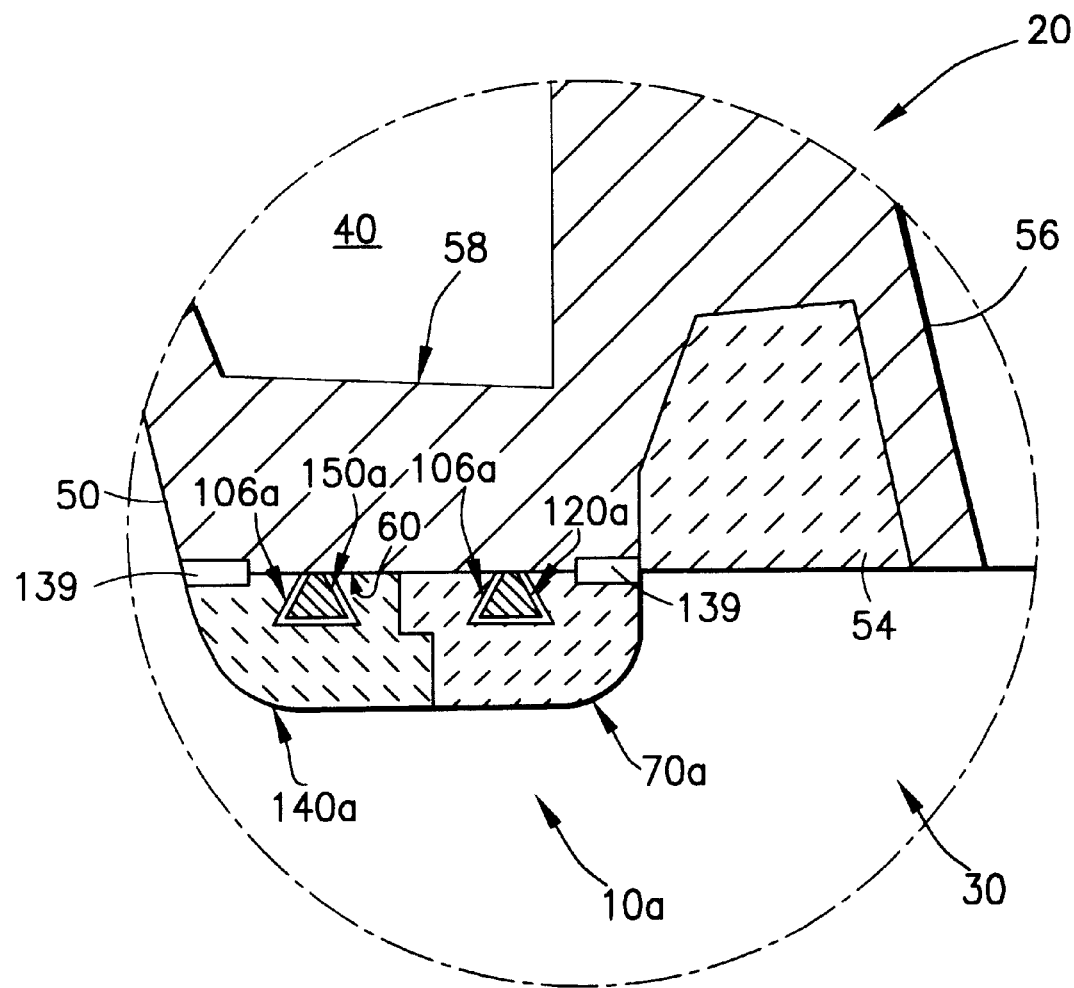
FIG. 9 is a view similar to FIG. 2 showing another embodiment of the invention.
Figure 10:
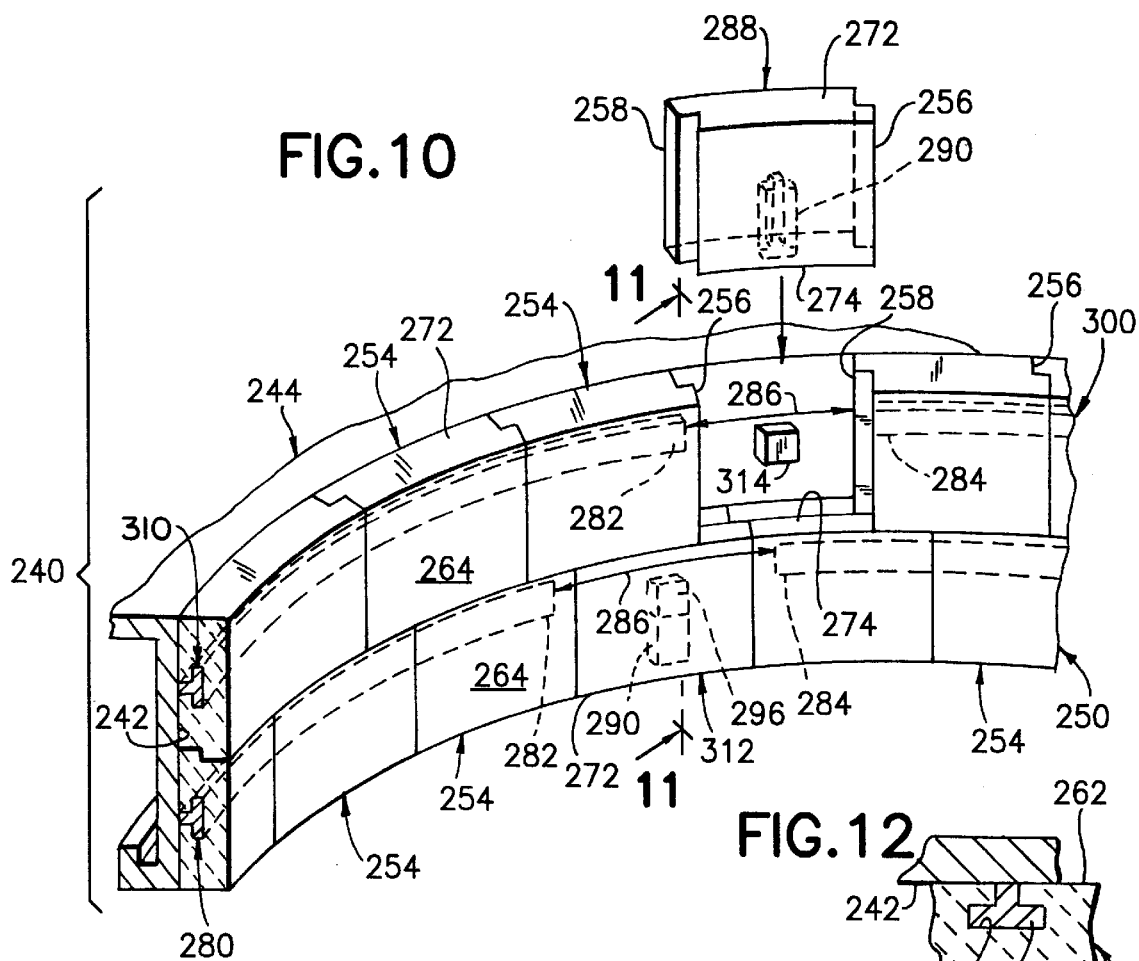
FIG. 10 is a simplified schematic perspective view of further embodiment of the invention wherein members of an annular refractory attachment are mounted to a vertical surface inside a gasifier such as a quench ring surface.
Figure 12:
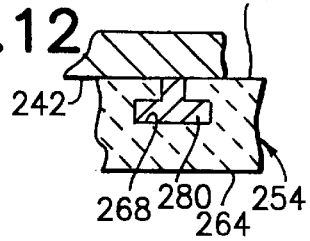
FIG. 12 is a sectional view taken on the line 12—12 of FIG. 11.
Figure 13:
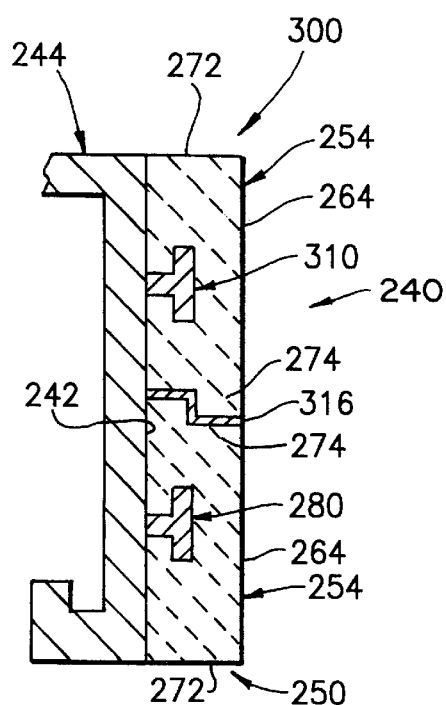
FIG. 13 is a sectional view thereof showing the annular refractory attachments with a layer of insulating material between a lower annular attachment structure and an upper annular attachment structure.
Figure 11:
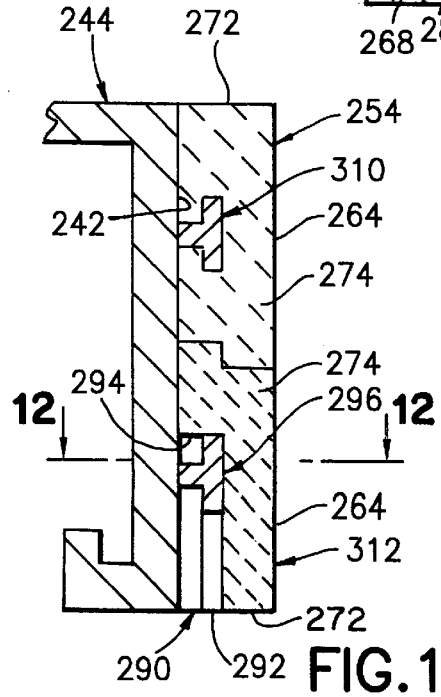
FIG. 11 is a sectional view taken on the line 11—11 of FIG. 10.

A protective refractory shield incorporating another embodiment of the invention is generally indicated by the reference number 10a in FIG. 9. The protective refractory shield 10a includes a radially inner annular refractory attachment 70a and a radially outer annular refractory attachment 140a both of which are formed with latching means that include a dove-tail or wedge-shaped recess or slot 106a. The attachments 70a and 140a are otherwise identical to the attachments 70 and 140 of the protective refractory shield 10.

Referring again to FIG. 9, latching means including dove-tail or wedge-shaped latch elements or latch rails 120a and 150a are provided on the protectable surface 60 of the fuel injector nozzle 20. The wedge-shaped latch rails 120a and 150a are of complementary cross section with the wedge-shaped latch recess 106a of the attachments 70a and 140a. Assembly of the annular refractory attachments 70a and 140a to the protectable surface 60 is accomplished in a manner similar to that described for the attachments 70 and 140 of the protective refractory shield 10.

A protective refractory shield incorporating still another embodiment of the invention is generally indicated by the reference number 240 in FIGS. 12–15. The protective refractory shield 240 includes generally circular lower and upper refractory attachments 250 and 300 mounted to a downwardly directed generally vertical surface 242 of a quench ring 244 of the gasifier (not shown). The surface 242 is thus a protectable surface.

Each refractory attachment 250 and 300 includes a plurality of attachment members or segments 254. The number of segments is a matter of choice and can be approximately 8 to 20 segments. The segments 254 can thus have an angular sector of approximately 18 to 45 degrees of arc. The segments 254 have stepped end portions 256 and 258 of complementary shape to permit meshing or overlapping of adjacent stepped end portions 256 and 258.

The segment 254 includes a securement surface 262 (FIG. 14) that confronts the protectable surface 242, and a heat exposure surface 264 that faces the heated environs of the gasifier chamber (not shown). The securement surface 262 has latching means that include a "T"-shaped recess or slot 268 that extends from the stepped end portion 256 to the stepped end portion 258. The heat exposure surface 264 is formed as a curved annular surface opposite the "T"-shaped recess 268. The curved heat exposure surfaces 264 of the segments 254 lie in a cylindrical plane substantially parallel to a central axis (not shown) of the attachment 250. The segments 254 further include horizontal edge 272 that is substantially planar and an opposite horizontal edge 274 (FIG. 13) that is stepped.

A "T"-shaped latch element or latch rail 280 formed as a complementary latching means for the "T"-shaped slot 268 is welded to the protectable surface 242 in the same manner that the "T"-shaped rail 120 is welded to the protectable surface 60 of the fuel injector nozzle 20.

The "T"-shaped latch rail 280 is a substantially annular formation with free end portions 282 and 284 that define a discontinuity or gap 286 in the rail 280. The discontinuity 286 in the rail 280 is slightly longer in arcuate length than any of the segments 254 measured from the stepped end portion 256 to the stepped end portion 258.

The arcuate size of the segment 254 is a matter of choice. If desired, segments 254 of different arcuate size can be used in any selected order for the attachments 250 and 300. However it should be noted that the discontinuity 286 in the latch rail 280 should be of sufficient size to accommodate the largest size segment 254.

Assembly of the attachment 250 to the protectable surface 242 is accomplished by loading the segments 254 onto the "T"-shaped latch rail 280 such that the "T"-shaped slot 268 at the stepped end 256, for example, engages the free end 282 of the rail 280. The segment 254 is slid along the "T"-shaped rail 280 until the trailing end portion 258 is located adjacent the free end 284 of the "T"-shaped rail 280. Additional segments 254 are sequentially loaded onto the "T"-shaped rail 280 in a manner similar to that previously described, and slid along the rail 280 until the stepped end portions 256 and 258 of each adjacent segment 254 mesh in the manner shown in FIG. 12.

When the rail 280 has been filly loaded with the segments 254 the gap 286 is ready for closure by a closure segment 288. The closure segment 288 includes a "T"-shaped securement slot 290 (FIG. 13) with an open end 292 that extends from the horizontal planar edge 272 to a closed end 294 approximately ⅔ of the distance between the horizontal edges 272 and 274. The closure segment 288 is otherwise identical to the segment 254.

A "T"-shaped metallic stud 296 with a rectangular head is welded to the protectable surface 242 in the gap 286 after the rail 280 has been fully loaded with the segments 254. The stud 296 is located approximately midway between the rail ends 282 and 284 and is of complementary shape with the slot 290 in the closure segment 288. The closure segment 288 can thus be engaged with the metal stud 296 in the manner shown in FIG. 12. Once the closure segment 288 is engaged upon the metal stud 296 it can be secured or bonded with a suitable known ceramic adhesive. The stepped end portions 256 and 258 of the segment 288 mesh with the stepped end portions 258 and 256 of the segments 254 at the rail ends 282 and 284, thereby preventing any movement of the segments 254 relative to the rail 280.

Another latch rail 310 identical to the latch rail 280 is welded onto the protectable surface 242 a predetermined axial distance from the latch rail 280. The latch rail 310 accommodates the segments 254 in the same manner as the latch rail 280. However the segments 254 are rotated 180° such that the stepped end portion 274 of the segments 254 on the rail 280 engage the stepped end portion 274 of the segments 254 on the rail 310.

The segments 254 are loaded onto the rail 310 in a manner similar to that described for the segments 254 on rail 280. When the rail 310 is fully loaded with the segments 254 the gap 286 in the rail 310 is closed with a closure segment 312 mounted on a "T"-shaped stud 314 identical to the "T" stud 296. The closure segment 312 is similar to the closure segment 288 except that the open end of the slot 290 is at the stepped edge 274.

If desired a sealing material 316 (FIG. 15) such as silicon carbide mortar can be provided between the lower and upper attachments 250 and 300 before the upper attachment 300 is interengaged with the lower attachment 250. The sealing material 316 serves to lock the attachments together and prevent movement thereof relative to the rails 280 and 310.

Although the size of the attachments 250 and 300 can vary according to the size of the protectable surface 242 the segment 258 can have a radius of approximately 18–42 inches and a radial thickness of approximately ½ to 1 inch. The axial height of the segment 258 from the horizontal surface 272 to the horizontal surface 274 can be approximately ¾ inch. The step at the surface 274 can project approximately ¼ inch. The "T"-shaped rails 280 and 310 are approximately ½ inch high from the protectable surface 242. The leg of the rails 280 and 310 is approximately ¹⁄₁₆ inch thick and the top of the "T" is ⅛ inch wide and ¹⁄₁₆ inch thick. The slot 268 is sized to permit slideable movement of the segments 258 on the rails 280 and 310. A clearance of approximately ¹⁄₃₂ inch wide is provided between the rails 280 and 310 and the "T"-shaped slot 268.

It should be noted that dove-tail or wedge-shaped rails and slots can be used wherever "T"-shaped rails and slots are shown.

Some advantages of the invention evident from the foregoing description include a protective refractory shield for a gasifier that does not weaken the protectable surface of the gasifier and is mechanically secured against the protectable surface by latching members. The latching members project from the protectable surface and engage complementary shaped latch recesses that are provided in the refractory attachment. Since securement of the protective refractory shield for a gasifier is not reliant upon bonding material, the refractory shield can remain in place under conditions which would adversely affect a bonding material. The protective refractory shield can be easily installed, repaired or replaced and thus enables the protectable surface of the gasifier to withstand thermal damage and thermal chemical degradation thereby prolonging the service life of the gasifier.

In view of the above, it will be seen that the several objects of the invention are achieved, and other advantageous results attained.

As various changes can be made in the above constructions without departing from the scope of the invention, it is intended that all matter contained in the above description or shown in the accompanying drawings shall be interpreted as illustrative and not in a limiting sense.

What is claimed is:

1. A protective shield for a gasifier comprising;
   (a) a refractory attachment mountable on a protectable surface inside a gasifier,
   (b) said refractory attachment having a heat exposure surface that is exposed to a heat stream in the gasifier and a securement surface that confronts the protectable surface inside the gasifier, and
   (c) latching means provided at said securement surface and at said protectable surface for mechanical securement of said refractory attachment onto the protectable surface without said refractory attachment penetrating the protectable surface.

2. The protective shield as claimed in claim 1 wherein said refractory attachment is annular and includes a plurality of attachment members of predetermined angular sector each said attachment member having a pair of angularly spaced end portions and said attachment members being in substantial abutment at said end portions.

3. The protective shield as claimed in claim 2 wherein said latching means include a latch element provided on the protectable surface projecting outside said protectable surface and a complementary latch portion formed at the securement surface of said attachment members for engagement with said latch element.

4. The protective shield as claimed in claim 2 wherein each of said attachment members include said securement surface and said heat exposure surface.

5. The protective shield as claimed in claim 3 wherein said latch element includes a "T"-shaped formation that projects from the protectable surface.

6. The protective shield as claimed in claim 3 wherein said latch element includes a wedge-shaped or dove-tail formation that projects from the protectable surface.

7. The protective shield as claimed in claim 3 wherein said complementary latch portion is a latch recess formed in the securement surface of said attachment members.

8. The protective shield as claimed in claim 7 wherein said latch element projects from the protectable surface.

9. The protective shield as claimed in claim 8 wherein said latch element has a circular path.

10. The protective shield as claimed in claim 9 wherein the circular path of said latch element is non-continuous.

11. The protective shield as claimed in claim 7 wherein said latch element is "T"-shaped.

12. The protective shield as claimed in claim 7 wherein said latch element is a wedge-shaped or dove-tail formation.

13. The protective shield as claimed in claim 7 wherein said latch recess is "T" shaped in cross section.

14. The protective shield as claimed in claim 7 wherein said latch recess has a wedge-shaped or dove-tail formation in cross-section.

15. The protective shield as claimed in claim 7 wherein said attachment members have opposite end portions and said latch recess extends from one said end portion to the other said end portion of said attachment members.

16. The protective shield as claimed in claim 2 including a plurality of said annular refractory attachments concentrically engaged.

17. The protective shield as claimed in claim 2 including a plurality of said annular refractory attachments engaged one above the other in a generally cylindrical plane.

18. The protective shield as claimed in claim 1 wherein said latching means includes a dovetail formation that projects from the protectable surface.

19. A protective shield for a gasifier comprising;
   (a) an annular refractory attachment mountable on a protectable surface inside a gasifier,
   (b) said annular refractory attachment including a plurality of attachment members of predetermined angular sector each said attachment member having a pair of angularly spaced end portions and said attachment members being in substantial abutment at said end portions,
   (c) said attachment members having a heat exposure surface that is exposed to a heat stream in the gasifier and a securement surface that confronts the protectable surface inside the gasifier,
   (d) latching means provided at said securement surface and at said protectable surface for mechanical securement of said refractory attachment onto the protectable surface without said refractory attachment penetrating the protectable surface.

20. A gasifier comprising;
   (a) a protectable surface inside the gasifier exposed to heat within the gasifier,
   (b) a refractory attachment mountable on the protectable surface,
   (c) said refractory attachment having a heat exposure surface that is exposed to a heat stream in the gasifier and a securement surface that confronts the protectable surface inside the gasifier, and
   (d) latching means provided at said securement surface and at said protectable surface for mechanical securement of said refractory attachment onto the protectable surface without said refractory attachment penetrating the protectable surface.

21. A gasifier comprising;
   (a) a protectable surface inside the gasifier exposed to heat within the gasifier,
   (b) an annular refractory attachment mountable on the protectable surface,
   (c) said annular refractory attachment including a plurality of attachment members of predetermined angular sector each said attachment member having a pair of angularly spaced end portions and said attachment members being in substantial abutment at said end portions,
   (d) said attachment members having a heat exposure surface that is exposed to a heat stream in the gasifier and a securement surface that confronts the protectable surface inside the gasifier,
   (e) latching means provided at said securement surface and at said protectable surface for mechanical securement of said refractory attachment onto the protectable surface without said refractory attachment penetrating the protectable surface.

\* \* \* \* \*

UNITED STATES PATENT AND TRADEMARK OFFICE
CERTIFICATE OF CORRECTION

PATENT NO. : 6,228,224 B1
DATED : May 8, 2001
INVENTOR(S) : Donald Duane Brooker It is certified that error appears in the above-identified patent and that said Letters Patent is hereby corrected as shown below:

Column 1,
Line 24, change "sluny" to -- slurry --.
Line 64, change "placement" to -- replacement --.
Line 66, change "going" to -- ongoing --.

Column 2,
Line 2, change "fording" to -- affording --.

Column 6,
Line 22, change "he" to -- the --.

Column 7,
Line 23, change "Tail" to -- rail --.
Line 35, change "170" to -- 176 --.
Line 38, change "170" to -- 176 --.
Line 45, change "170" to -- 176 --.
Line 49, change "170" to -- 176 --.

Column 8,
Line 58, change "12-15" to -- 10-13 --.

Column 9,
Line 6, change "14" to -- 12 --.

UNITED STATES PATENT AND TRADEMARK OFFICE
CERTIFICATE OF CORRECTION

PATENT NO. : 6,228,224 B1
DATED : May 8, 2001
INVENTOR(S) : Donald Duane Brooker It is certified that error appears in the above-identified patent and that said Letters Patent is hereby corrected as shown below:

Column 10,
Line 21, change "15" to -- 13 --.

Signed and Sealed this

Eighth Day of January, 2002

*Attest:*

*Attesting Officer*

JAMES E. ROGAN
*Director of the United States Patent and Trademark Office*